US012606094B2

(12) United States Patent
Kim et al.

(10) Patent No.: US 12,606,094 B2
(45) Date of Patent: Apr. 21, 2026

(54) CENTER CONSOLE DEVICE FOR VEHICLES

(71) Applicants: HYUNDAI MOTOR COMPANY, Seoul (KR); KIA CORPORATION, Seoul (KR); KBI DONGKOOK IND. CO., LTD., Seoul (KR)

(72) Inventors: Cheon Ho Kim, Hwaseong-si (KR); Hong Sik Chang, Hwaseong-si (KR); Won Young Bae, Seoul (KR); Jung Yoon Jang, Seoul (KR); Jung Hoon Woo, Suwon-si (KR); Dong il Son, Ulsan (KR); Chang Bok Park, Hwaseong-si (KR); Dong Yong Choi, Suwon-si (KR); Yoo Wook Jeon, Asan-si (KR); Jong Hyeon Kim, Suwon-si (KR)

(73) Assignees: Hyundai Motor Company, Seoul (KR); Kia Corporation, Seoul (KR); KBI Dongkook Ind. Co., Ltd., Seoul (KR)

( * ) Notice: Subject to any disclaimer, the term of this patent is extended or adjusted under 35 U.S.C. 154(b) by 427 days.

(21) Appl. No.: 18/388,692

(22) Filed: Nov. 10, 2023

(65) Prior Publication Data
US 2024/0416843 A1     Dec. 19, 2024

(30) Foreign Application Priority Data
Jun. 16, 2023     (KR) ........................ 10-2023-0077224

(51) Int. Cl.
B60R 7/04 (2006.01)
B60N 2/75 (2018.01)

(52) U.S. Cl.
CPC ................ B60R 7/04 (2013.01); B60N 2/773 (2018.02); B60N 2/793 (2018.02)

(58) Field of Classification Search
CPC ................................. B60N 2/773; B60N 2/793
(Continued)

(56) References Cited

U.S. PATENT DOCUMENTS 3,371,968 A * 3/1968 Loake .................. A47B 88/493
312/333
6,203,088 B1 * 3/2001 Fernandez ............. B60N 2/773
297/411.21
(Continued)

FOREIGN PATENT DOCUMENTS

AU       2021104689 A4 * 9/2021 ............ B60P 1/4414
EP         4177111 A1 * 5/2023 ............... B60R 7/04
(Continued)

OTHER PUBLICATIONS

Translation of FR 3007341 (Year: 2014).*
Translation of EP 4177111 (Year: 2023).*

*Primary Examiner* — Amy R Weisberg
*Assistant Examiner* — Veronica M Condo
(74) *Attorney, Agent, or Firm* — Morgan Lewis & Bockius LLP

(57)     ABSTRACT

A console device for vehicles, includes a first rail fixed to a vehicle body, a second rail combined with the first rail to be selectively slid in forward and rearward directions, and combined with a center console, a first stopper mounted on the second rail to be slid together with the second rail, and engaged with the first rail to selectively fix a sliding position of the second rail, a tray rail combined with the second rail to be slid in the forward and rearward directions, and combined with a tray provided in the center console, and a second stopper mounted on the tray rail to be slid together with the tray rail, and engaged with the second rail to selectively fix a sliding position of the tray rail.

15 Claims, 13 Drawing Sheets

(58) Field of Classification Search
USPC .................................... 296/1.09, 24.34, 37.8
See application file for complete search history.

(56) References Cited

U.S. PATENT DOCUMENTS

| | | | | |
|---|---|---|---|---|
| 6,419,314 | B1 * | 7/2002 | Scheerhorn ............ | B60N 2/773 |
| | | | | 312/324 |
| 7,152,897 | B2 * | 12/2006 | Bonnes ..................... | B60R 7/04 |
| | | | | 296/35.1 |
| 7,481,475 | B1 * | 1/2009 | Lim .......................... | B60R 7/04 |
| | | | | 296/37.8 |
| 8,196,985 | B2 * | 6/2012 | Penner ..................... | B60R 7/04 |
| | | | | 296/24.34 |
| 9,156,407 | B1 * | 10/2015 | Kramer ..................... | B60R 7/04 |
| 9,211,844 | B2 * | 12/2015 | Washio .................. | B60N 2/793 |
| 10,011,240 | B1 * | 7/2018 | Ranganathan ......... | B60N 3/101 |
| 10,661,717 | B2 * | 5/2020 | Lee ........................... | B60R 7/04 |
| 11,279,293 | B2 * | 3/2022 | Razvi ....................... | B60R 7/04 |
| 2008/0290680 | A1 * | 11/2008 | Busha ................... | B60N 3/101 |
| | | | | 296/24.34 |
| 2019/0283680 | A1 * | 9/2019 | Vican ........................ | B60R 7/04 |
| 2020/0346564 | A1 * | 11/2020 | Dry .......................... | B60N 2/08 |
| 2023/0356663 | A1 * | 11/2023 | Son ........................... | B60R 7/04 |
| 2025/0146740 | A1 * | 5/2025 | Zhang ..................... | B60R 7/04 |

FOREIGN PATENT DOCUMENTS

| | | | | |
|---|---|---|---|---|
| FR | 3007341 A1 * | 12/2014 | ............. | B60N 3/002 |
| KR | 10-2018-0042632 A | 4/2018 | | |

* cited by examiner

LOCKING ON

LOCKING OFF

CENTER CONSOLE DEVICE FOR VEHICLES

CROSS-REFERENCE TO RELATED APPLICATION

The present application claims priority to Korean Patent Application No. 10-2023-0077224 filed on Jun. 16, 2023, the entire contents of which is incorporated herein for all purposes by this reference.

BACKGROUND OF THE PRESENT DISCLOSURE

Field of the Present Disclosure

The present disclosure relates to a center console device for vehicles. More particularly, it relates to a center console device for vehicles which includes a three-stage rail structure having rails slidably combined with each other to facilitate not only sliding of a center console but also sliding of a tray received in the center console.

Description of Related Art

In general, a console for vehicles is a structure provided in a space between a driver's seat and a front passenger seat in a vehicle interior, and is used as a storage of articles used by a driver and passengers of a vehicle while driving of the vehicle.

Such a console for vehicles is used to support the driver's arm to reduce driver fatigue from driving when the driver drives the vehicle for a long time, other than the purpose of storing articles.

The conventional console for vehicles includes a console main body provided in a form of a box having an opened upper part and combined with the bottom surface between the driver's seat and the front passenger seat, and a cover member hinged to one side of the upper end of the console main body to shield the opened upper part of the console main body.

Here, the console main body is provided in a form of the box having the opened upper part, and thus includes a storage space to store articles.

Furthermore, the cover member is hinged to the side of the upper end portion of the console main body, serves to open or close the opened upper part of the console main body, and also serves as an armrest so that the driver may conveniently rest his or her arm thereon after closing the upper end of the console main body.

However, in the above-described conventional console for vehicles, the position thereof is completely fixed to the driver's seat and the front passenger seat, and thus, it is inconvenient for passengers sitting on the rear seat to use the console, and there are many restrictions on movement of passengers due to no space between the driver's seat and the front passenger seat.

For the present purpose, a console for vehicles combined with the bottom surface between the driver's seat and the front passenger seat by rails to be slidable has been developed but, as various functions are added to the console for vehicles recently, the structure of the console becomes complicated due to sliding and these additional functions, and thus, efforts to simplify the complicated structure of the console are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a center console device for vehicles which employs a three-stage rail structure including rails slidably combined with each other to facilitate not only sliding of a center console in the forward and rearward directions but also sliding of a tray received in the center console and thus to achieve structural simplification for sliding and to improve convenience of use.

In one aspect, the present disclosure provides a console device for vehicles, including a first rail fixed to a vehicle body, a second rail combined with the first rail to be selectively slid in forward and rearward directions, and combined with a center console, a first stopper mounted on the second rail to be slid together with the second rail, and engaged with the first rail to selectively fix a sliding position of the second rail, a tray rail combined with the second rail to be slid in the forward and rearward directions, and combined with a tray provided in the center console, and a second stopper mounted on the tray rail to be slid together with the tray rail, and engaged with the second rail to selectively fix a sliding position of the tray rail.

In an exemplary embodiment of the present disclosure, the first stopper may include a main body fixedly mounted on the second rail, a rail rod combined with an inside of a guide area provided in the main body, and provided to be movable within the guide area, and a pair of rack members provided to include a shape corresponding to a shape of a front portion of the rail rod, and configured to be selectively moved in directions facing each other due to elasticity, as the rail rod is moved.

In another exemplary embodiment of the present disclosure, the first stopper may further include at least one elastic member mounted in the main body, connected to the front portion of the rail rod, and configured to provide elastic restoring force to return the rail rod to an initial position thereof.

In yet another exemplary embodiment of the present disclosure, the initial position may be a position configured so that the pair of rack members is spaced from each other by the rail rod.

In yet another exemplary embodiment of the present disclosure, the rack members may be formed so that one side of each of the rack members configured to come in contact with the front portion of the rail rod is inclined in a direction corresponding to a remaining one of the rack members.

In still yet another exemplary embodiment of the present disclosure, the rack members may include coupling protrusions configured to extend downwards in a direction toward the first rail, and formed in a serrated shape.

In a further exemplary embodiment of the present disclosure, the first rail may include coupling guides formed in a serrated shape corresponding to the coupling protrusions, and configured to guide the second rail to fix the sliding position of the second rail, as the coupling protrusions are selectively engaged with the coupling guides.

In another further exemplary embodiment of the present disclosure, the second stopper may include a body combined with the tray rail, and engaging pieces configured to extend from the body toward the second rail, and located to be engaged with a pair of guide slots provided in the second rail to fix the sliding position of the tray rail.

In yet another further exemplary embodiment of the present disclosure, the second stopper may further include buffering members configured to absorb impact when the engaging pieces are engaged with both end portions of the guide slots.

In yet another further exemplary embodiment of the present disclosure, the buffering members may be formed of an elastic material.

In still yet another further exemplary embodiment of the present disclosure, the first rail may include wheel members configured to support rail members configured to extend downwards from the second rail, and rotated by movement of the rail members to guide sliding of the second rail.

In a still further exemplary embodiment of the present disclosure, the wheel members may be provided in a pair to support each of both sides of the rail members, and may be rotatably mounted in mounting holes formed in the first rail.

In a yet still further exemplary embodiment of the present disclosure, the mounting holes may be provided in plural so that distances between the mounting holes provided in respective pairs are different, and the wheel members may be mounted in a selected pair of the mounting holes so that a mounted position of the wheel members is varied.

In a still yet further exemplary embodiment of the present disclosure, the tray rail may include rail covers provided to shield both sides of the tray rail exposed due to withdrawal of the tray rail together with the tray to an outside of the center console.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

Figure 1:
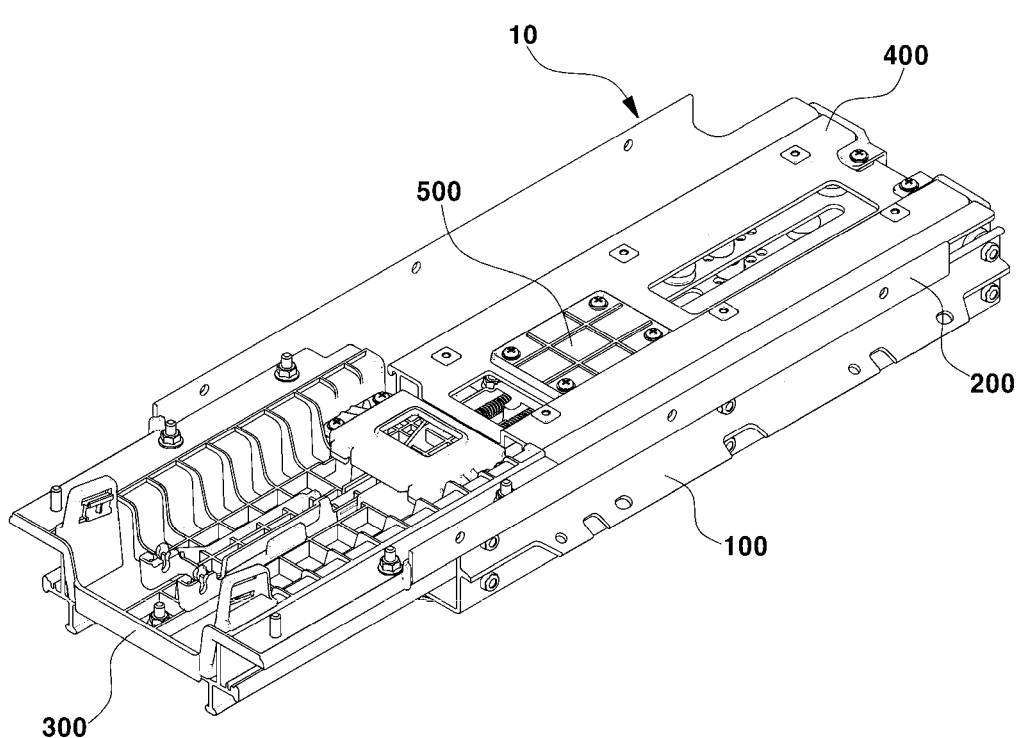
FIG. 1 is a perspective view showing a combined state of a rail connection structure of a console device for vehicles according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, reference will be made in detail to various embodiments of the present disclosure, examples of which are illustrated in the accompanying drawings and described below.

Advantages and features of the present disclosure and methods for achieving the same will become apparent from the descriptions of the exemplary embodiments hereinbelow with reference to the accompanying drawings.

However, the present disclosure is not limited to the exemplary embodiments included herein and may be implemented in various different forms, and these embodiments are provided to make the description of the present disclosure thorough and to fully convey the scope of the present disclosure to those skilled in the art. It is to be noted that the scope of the present disclosure is defined only by the claims.

Furthermore, in the following description of the present disclosure, a detailed description of known functions and configurations incorporated herein will be omitted when it may make the subject matter of the present disclosure rather unclear.

Figure 2:
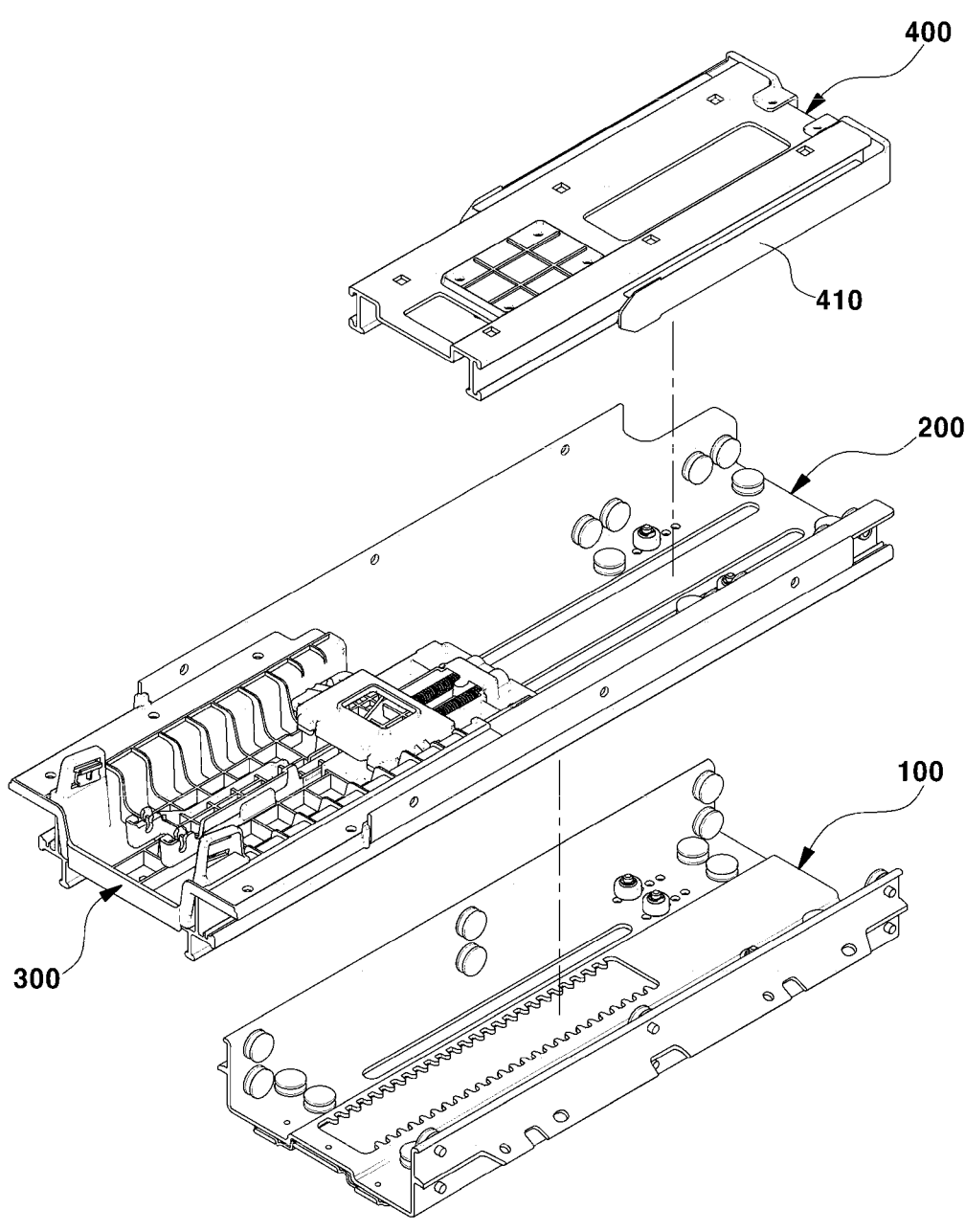
FIG. 2 is an exploded perspective view showing a separated state of the rail connection structure of the console device according to an exemplary embodiment of the present disclosure.
Figure 3:
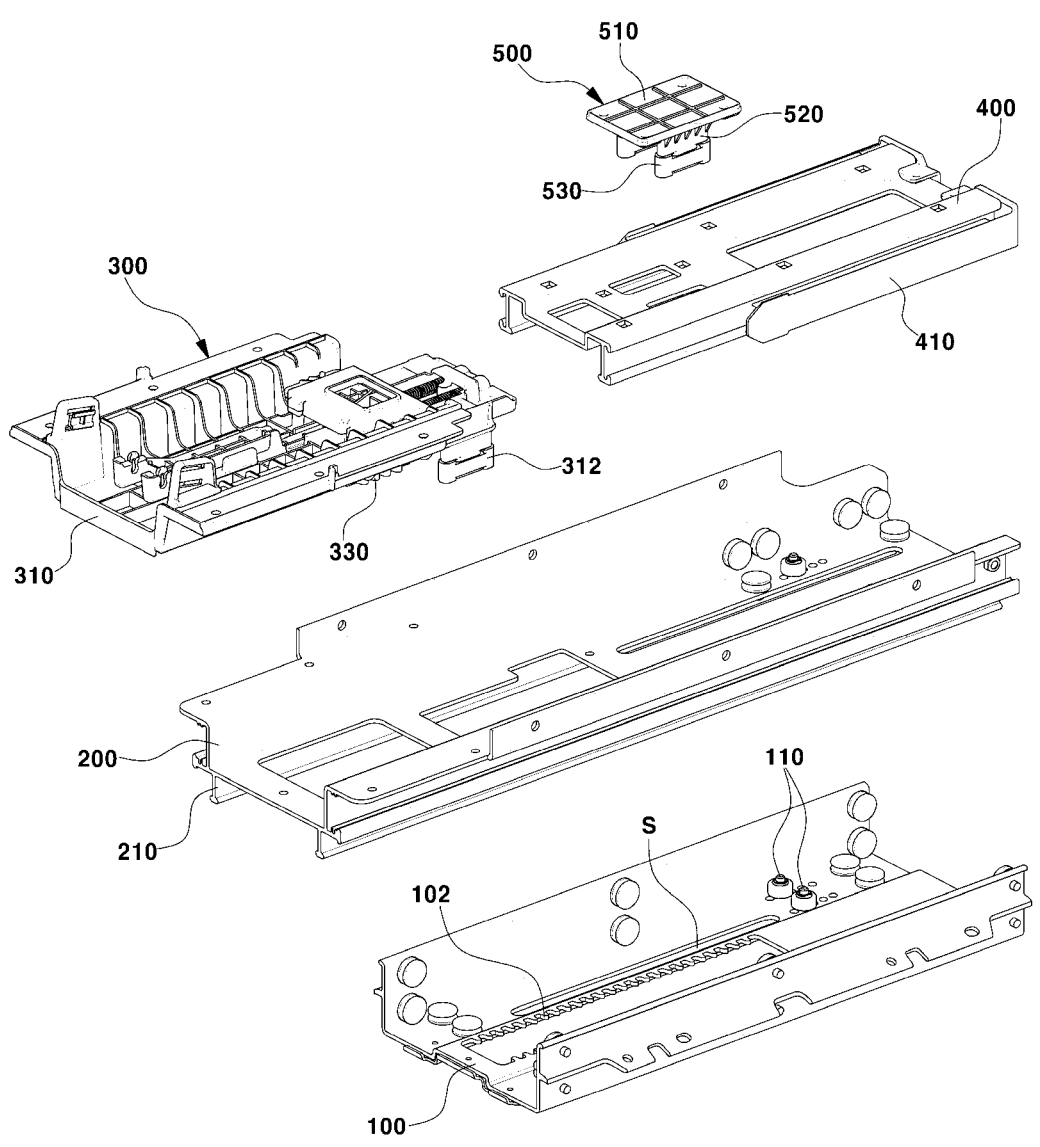
FIG. 3 is an exploded perspective view showing a detailed separated state of the rail connection structure of the console device according to an exemplary embodiment of the present disclosure.

FIG. 1 is a perspective view showing a combined state of a rail connection structure of a console device for vehicles according to an exemplary embodiment of the present disclosure, FIG. 2 is an exploded perspective view showing a separated state of the rail connection structure of the console device according to an exemplary embodiment of the present disclosure, and FIG. 3 is an exploded perspective view showing a detailed separated state of the rail connection structure of the console device according to an exemplary embodiment of the present disclosure.

Figure 4:
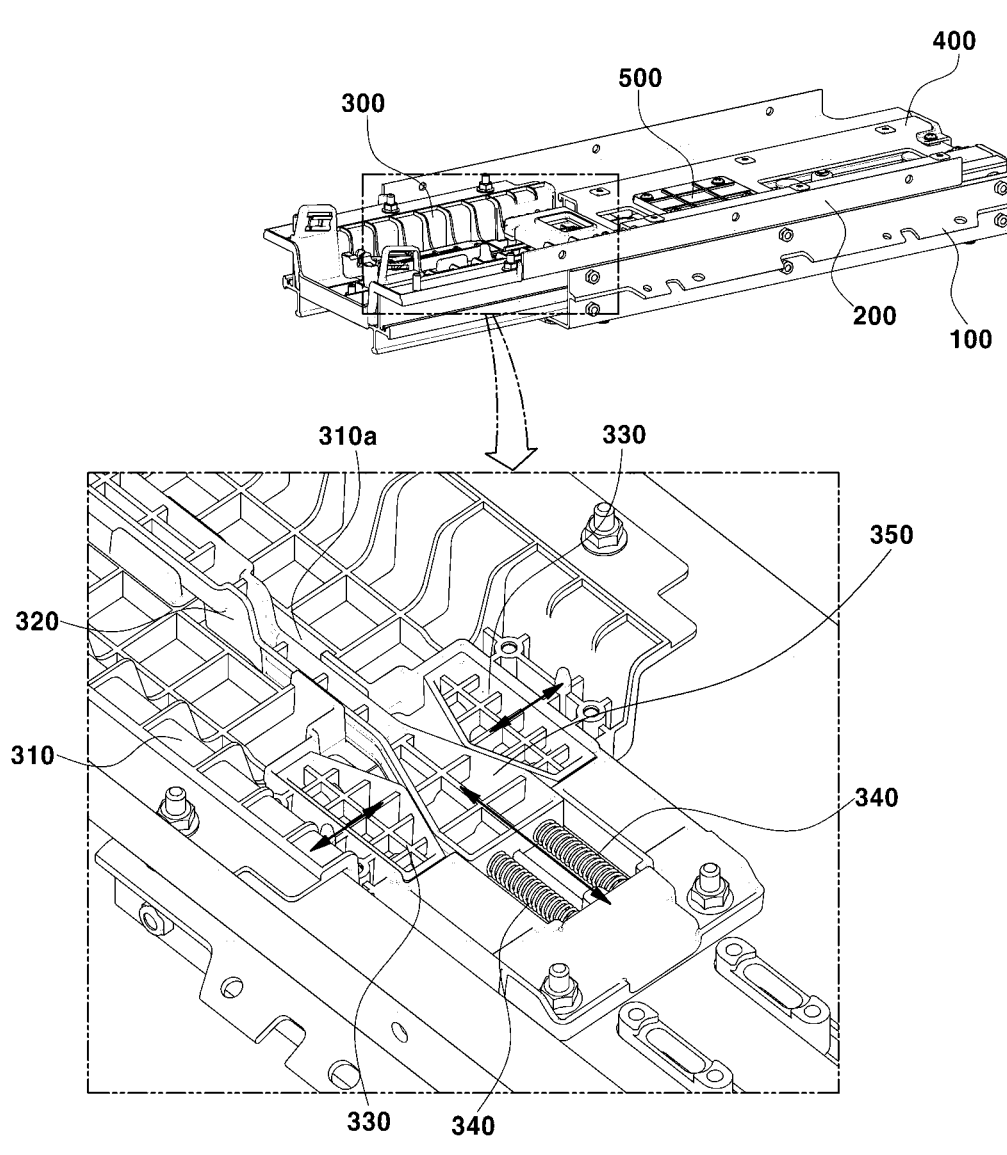
FIG. 4 shows an enlarged view of region A of the rail connection structure of the console device according to an exemplary embodiment of the present disclosure.
Figure 5A:
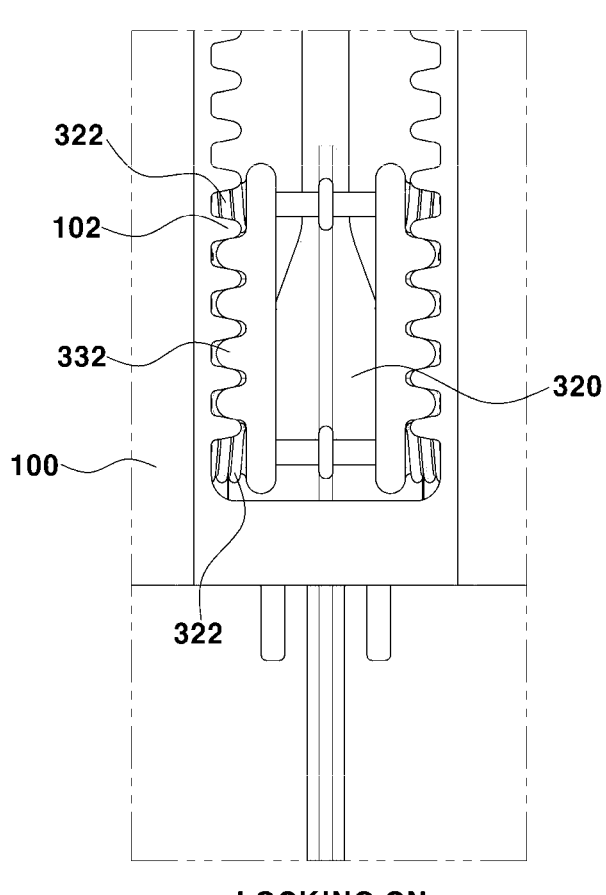
FIG. 5A and FIG. 5B are views showing locking and unlocking of a second rail of the rail connection structure of the console device according to an exemplary embodiment of the present disclosure.
Figure 5B:
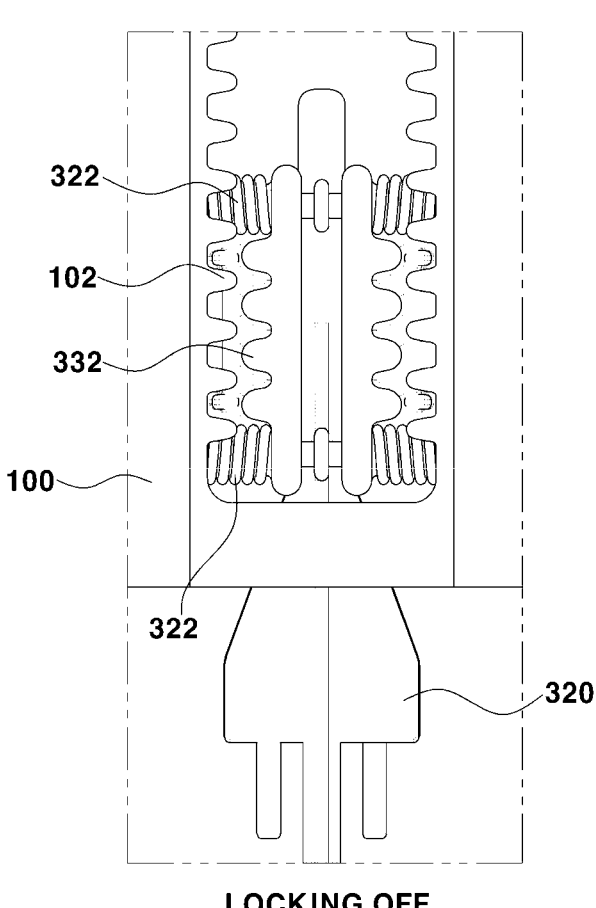
Figure 6:
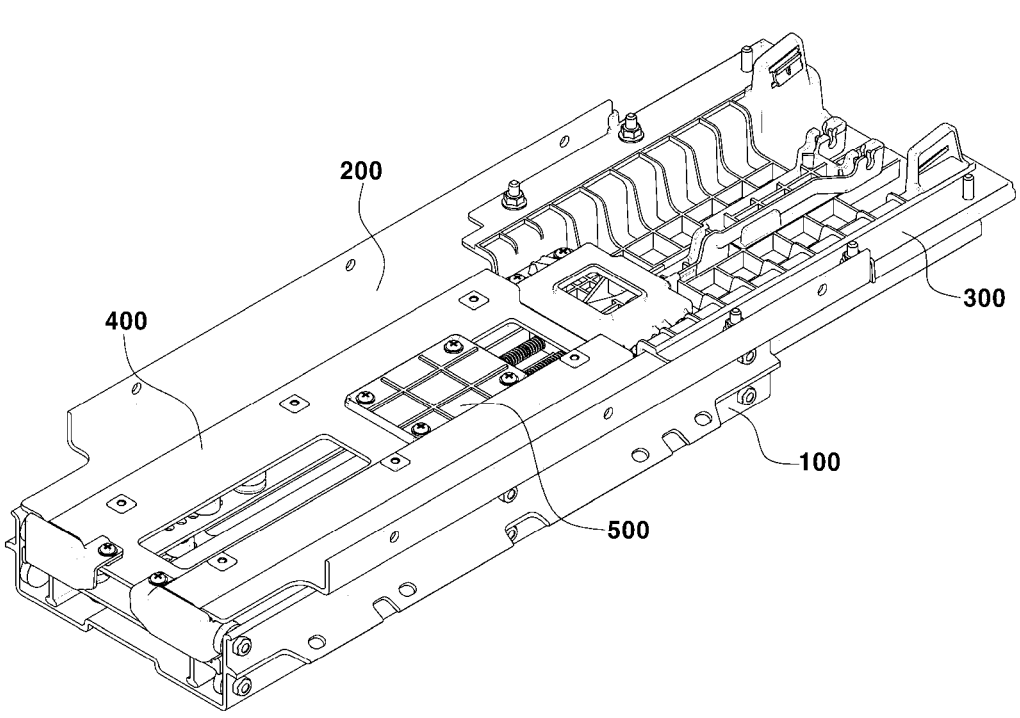
FIG. 6, FIG. 7, and FIG. 8 are perspective views sequentially illustrating an operating state of the rail connection structure of the console device according to an exemplary embodiment of the present disclosure.
Figure 7:
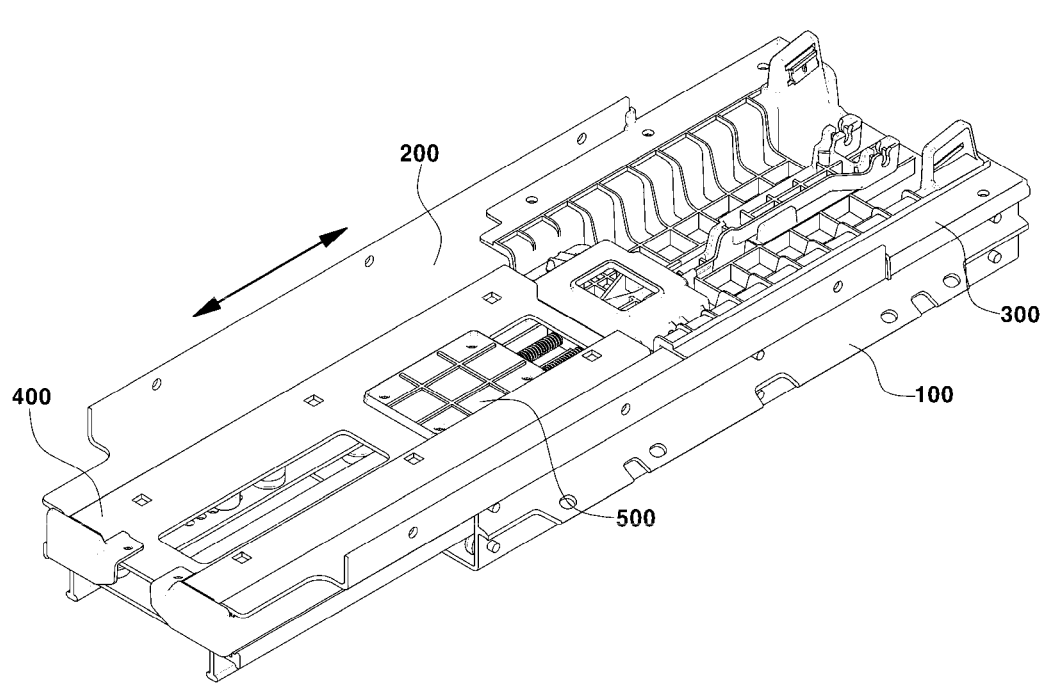
Figure 8:
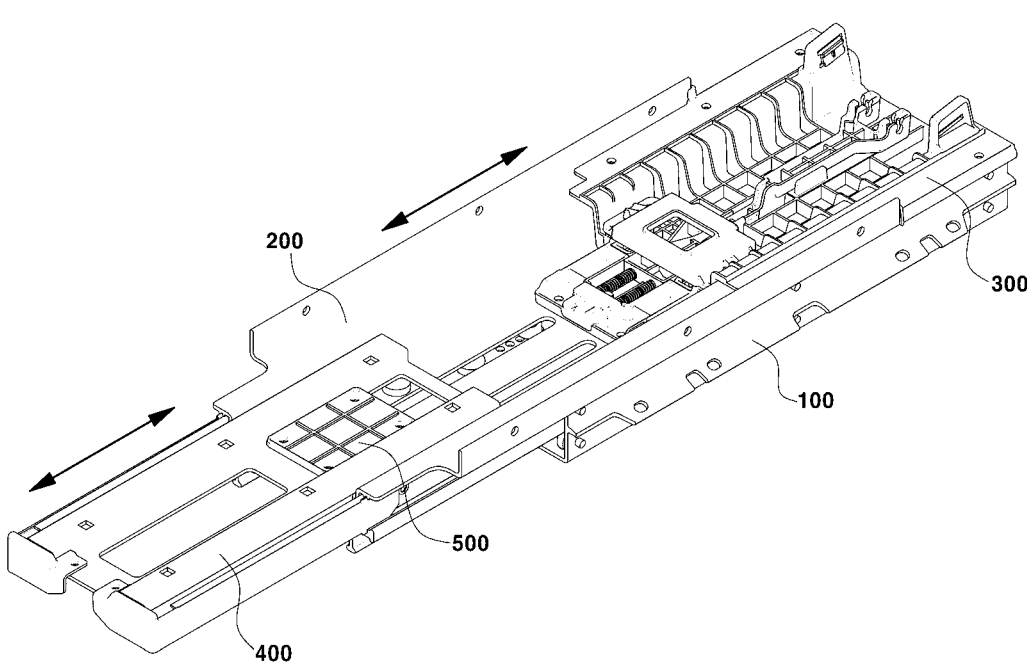

Furthermore, FIG. 4 shows an enlarged view of region A of the rail connection structure of the console device according to an exemplary embodiment of the present disclosure, FIG. 5A and FIG. 5B are views showing locking and unlocking of a second rail of the rail connection structure of the console device according to an exemplary embodiment of the present disclosure, and FIG. 6, FIG. 7, and FIG. 8 are perspective views sequentially illustrating an operating state of the rail connection structure of the console device according to an exemplary embodiment of the present disclosure.

Figure 9:
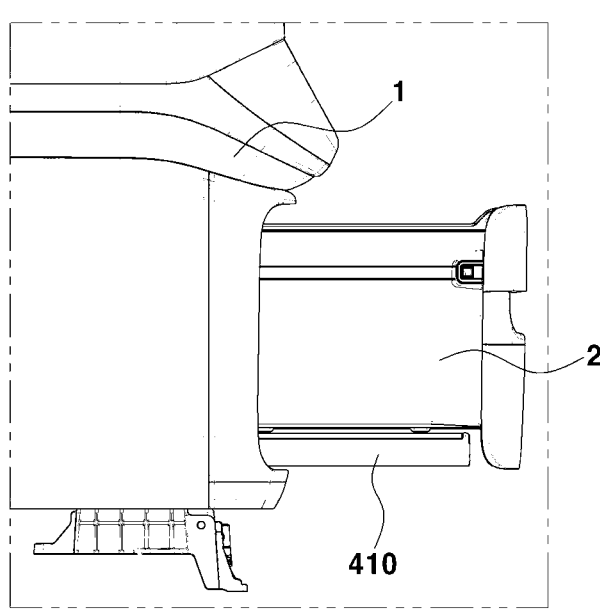
FIG. 9 is a view showing a rail cover of the rail connection structure of the console device according to an exemplary embodiment of the present disclosure.
Figure 10:
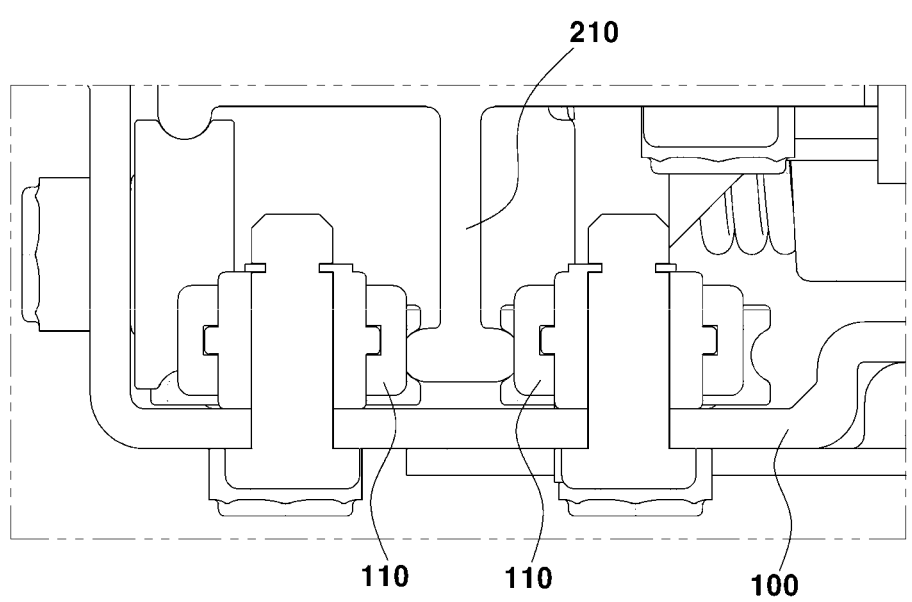
FIG. 10 is a view showing combination between a first rail and the second rail of the rail connection structure of the console device according to an exemplary embodiment of the present disclosure.
Figure 11:
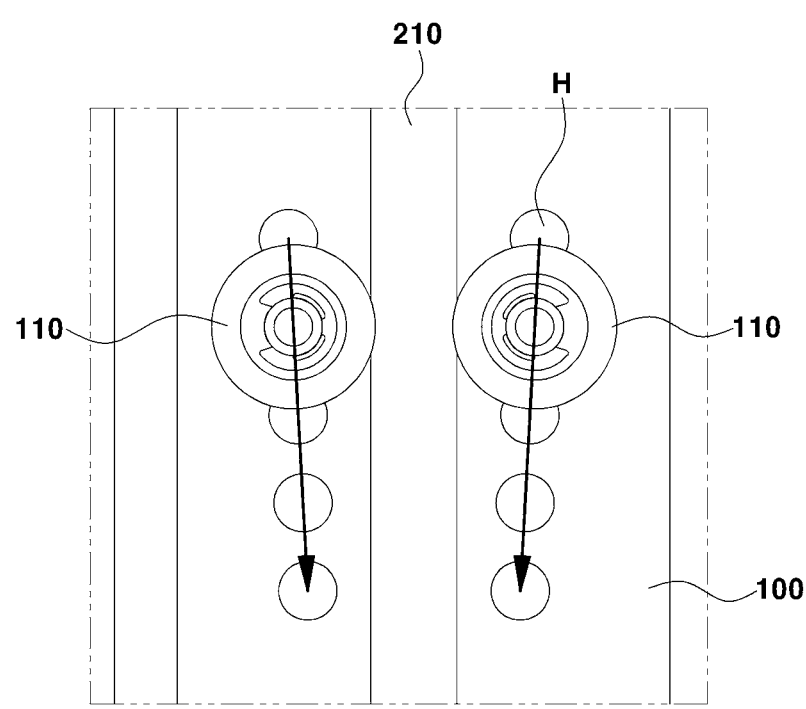
FIG. 11 is a view showing mounting holes of the rail connection structure of the console device according to an exemplary embodiment of the present disclosure.
Figure 12:
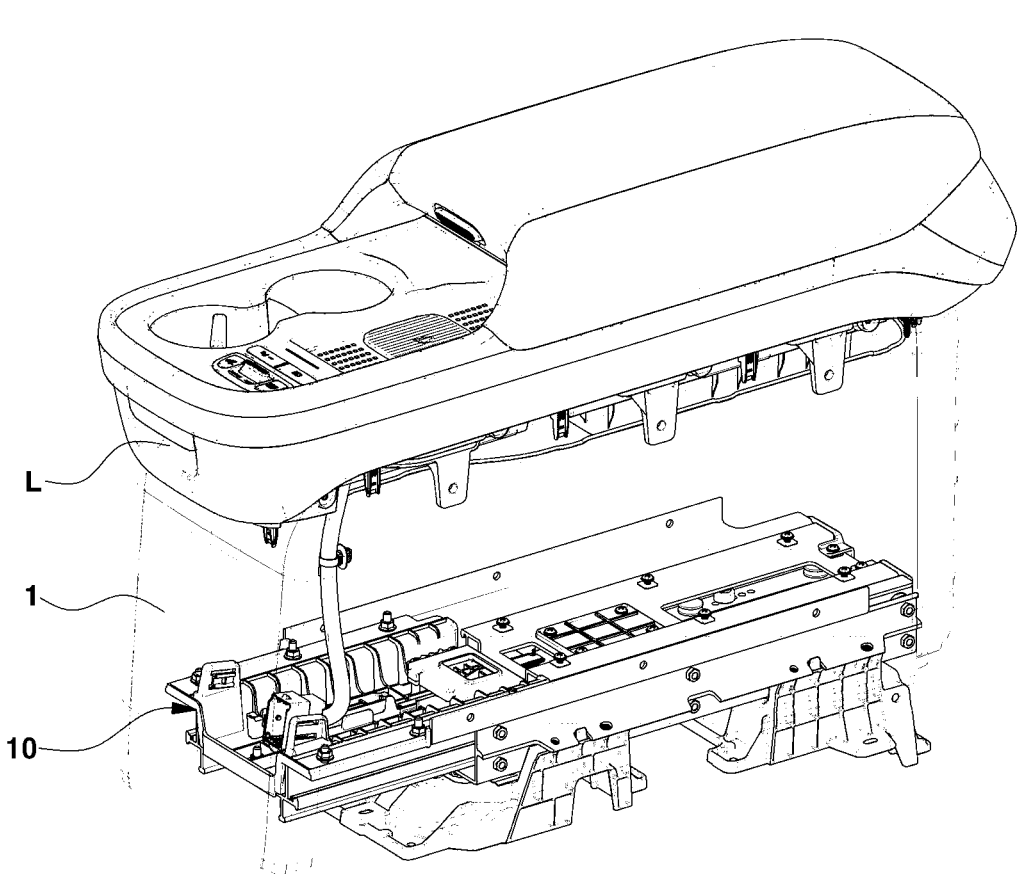
FIG. 12 is view showing a mounted state of the rail connection structure on the console device according to an exemplary embodiment of the present disclosure.

Furthermore, FIG. 9 is a view showing a rail cover of the rail connection structure of the console device according to an exemplary embodiment of the present disclosure, FIG. 10 is a view showing combination between a first rail and the second rail of the rail connection structure of the console device according to an exemplary embodiment of the present disclosure, FIG. 11 is a view showing mounting holes of the rail connection structure of the console device according to an exemplary embodiment of the present disclosure, and FIG. 12 is view showing a mounted state of the rail connection structure on the console device according to an exemplary embodiment of the present disclosure.

In general, a center console 1 for vehicles, which is a structure provided in a space between a driver's seat and a front passenger seat in a vehicle interior, may be configured so that various types of electrical and electronic components, such as a Universal Serial Bus (USB), a Shift-By-Wire (SBW) system, etc., may be mounted therein, and may be used as a storage in which articles used by a driver and passengers of the vehicle while driving are stored.

The center console 1 may be slidably mounted between the driver's seat and the front passenger seat, to provide convenience to passengers on the rear seat as much as possible in a vehicle in which seats are generally disposed in two rows or more, and a tray 2 may be slidably combined to the inside of the center console 1 to provide an additional storage.

For the present purpose, a three-stage rail structure, which may also be referred to as a rail connection structure 10, may be applied to the center console 1, as shown in FIG. 12, and the center console 1 and the tray 2 may include a simple structure and be easily moved by the rail connection structure 10.

That is, as shown in FIG. 1, FIG. 2, and FIG. 3, the console device according to the exemplary embodiment of the present disclosure is configured so that the center console 1 and the tray 2 may be individually slidably moved by the rail connection structure 10, more concretely, the three-stage rail connection structure formed by combining a first rail 100, a second rail 200, a first stopper 300, a tray rail 400, and a second stopper 500.

First, the first rail 100 is fixed to a vehicle body while having a designated length from a position between the driver's seat and the front passenger seat to connect the first row and the second row.

The second rail 200 is combined with the first rail 100 to be selectively slid in the forward and rearward directions of the first rail 100, and is combined with the inside of the center console 1 (with reference to FIG. 12).

The second rail 200 may be fixed at a sliding position thereof by the first stopper 300.

The first stopper 300 is fixedly mounted on the second rail 200, is slid together with the second rail 200, and is engaged with the first rail 100, selectively fixing the sliding position of the second rail 200.

For the present purpose, the first stopper 300 includes a main body 310, a rail rod 320, and rack members 330, as shown in FIG. 4.

The main body 310 is fixedly mounted at the front position of the second rail 200, and movement guides 312 protruding downwards from the main body 310 pass through the second rail 200 and are located in a slot S of the first rail 100, as shown in FIG. 3, and thus, the movement guides 312 guide sliding of the second rail 200 while moving in the longitudinal direction of the slot S.

Furthermore, the rail rod 320 is combined with the inside of a guide area 310a provided in the main body 310, and is provided to be selectively movable within the guide area 310a by operating a lever L (with reference to FIG. 12).

More concretely, the rail rod 320 may be moved in the forward and rearward directions in the guide area 310a of the main body 310 by operating the lever L of the center console 1, and the position of the rail rod 320 may be fixed by a pair of elastic members 340 in the main body 310.

That is, the elastic members 340 are mounted in the main body 310, and are connected to the front portion of the rail rod 320 to guide the rail rod 320 to fix the position of the rail rod 320, and the elastic members 340 may be compressed in the state in which the rail rod 320 is moved by operating the lever L, and may thus provide elastic restoring force to the rail rod 320 to return the rail rod 320 to the initial position thereof.

The initial position of the rail rod 320 is defined as a position at which a pair of the rack members 330 is spaced from each other by the rail rod 320 (with reference to FIG. 4). When the rail rod 320 is moved from such an initial position by operating the lever L, the elastic members 340 are compressed, and the rack members 330 are located to be adjacent to each other in directions facing each other, and when operation of the lever L is completed, the rail rod 320 is moved by the elastic restoring force of the elastic members 340, and the rack members 330 are returned to the initial positions thereof spaced from each other by the shape of the front portion of the rail rod 320.

Here, the rack members 330 including shapes corresponding the shapes of the left and right sides of the front portion of the rail rod 320 are provided in a pair, and are configured to be selectively moved in the directions facing each other as the rail rod 320 is moved by operating the lever L.

In an exemplary embodiment of the present disclosure, the rail rod 320 may include a protrusion 350.

The rack members 330 are formed so that one side of each of the rack members 330 coming in contact with the front portion of the rail rod 320 is inclined in a direction corresponding to the other of the rack members 330, and thereby, when the rail rod 320 is moved, the rail rod 320 deviates from a space between the rack members 330 due to the inclined shape of the rail rod 320 and the rack members 330 are located to be adjacent to each other, and on the contrary, when the rail rod 320 is returned to the initial position thereof, the rail rod 320 pushes the rack members 330 by the corresponding inclined surfaces, i.e. the protrusion 350 of the rail rod 320, and thus the rack members 330 are located to be spaced apart from each other by the protrusion 350.

The rack members 330 provided in a pair include coupling protrusions 332 which extend downwards in a direction toward the first rail 100 (with reference to FIG. 3), and are formed in a serrated shape on the external surfaces of the rack members 330, as shown in FIG. 5A and FIG. 5B.

Furthermore, the first rail 100 includes coupling guides 102 which are formed in a serrated shape corresponding to the coupling protrusions 332, and guide the second rail 200 to fix the sliding position of the second rail 200, as the coupling protrusions 332 are selectively engaged with the coupling guides 102.

When the rail rod 320 is moved and the rack members 330 are located to be adjacent to each other by the elastic restoring force of springs 322, the engagement state between the coupling protrusions 332 and the coupling guides 102 is released, and thus, the second rail 200 may be freely slidable (with reference to FIG. 5B), and on the contrary, when the rail rod 320 is returned to the initial position thereof, the springs 322 are compressed, and the rack members 330 are located to be spaced from each other, the coupling protrusions 332 and the coupling guides 102 are engaged with each other, and thus, the second rail 200 may not be slidable (with reference to FIG. 5A).

That is, as shown in FIG. 6 and FIG. 7, when the second rail 200 is slid along the first rail under the initial state by operating the lever L, the rail rod 320 is moved, the rack members 330 are located to be adjacent to each other, which is to say, the engagement state between the coupling protrusions 332 and the coupling guides 102 is released (with reference to FIG. 5B), and thus, the second rail 200 is slidable. Accordingly, when operation of the lever L of the center console 1 is released, the rail rod 320 is returned to the initial position thereof, and the rack members 330 are located to be spaced from each other, the coupling protrusions 332 and the coupling guides 102 are in the engaged state (with reference to FIG. 5A), and thus, the second rail 200 is not slidable.

Through the above structure in the exemplary embodiment of the present disclosure, sliding of the second rail 200 is possible only when the lever L is operated, and sliding of the second rail 200 is not possible when operation of the lever L is released, and therefore, problems caused by free movement of the second rail 200 in various driving situations, such as collision of the second rail 200 with passengers and injuries to the passengers caused thereby, may be prevented.

The tray rail 400 is combined with the rear position of the second rail 200 to be slid in the forward and rearward directions, and is combined with the tray 2 provided in the center console 1 to provide an additional storage, as shown in FIG. 9.

A rail cover 410 may be mounted at each of both sides of the tray rail 400 (with reference to FIG. 2 and FIG. 3), and the rail covers 410 shields the sides of the tray rail 400 which are exposed due to withdrawal of the tray rail 400 together with the tray 2 to the outside of the center console 1, and may thus prevent foreign substances from being introduced to the rail connection structure 10 mounted in the center console 1.

Furthermore, the tray rail 400, the first rail 100 and the second rail 200 may form the three-stage rail structure in the center console 1, as shown in FIG. 8, and allow the tray 2 to be additionally withdrawn.

Here, the second stopper 500 is mounted on the tray rail 400, slides together with the tray rail 400, and is engaged with the second rail 200, selectively fixing the sliding position of the tray rail 400.

For the present purpose, the second stopper 500 includes a body 510 and engaging pieces 520, as shown in FIG. 3.

The body 510 is fixedly mounted on the tray rail 400, and is slid on the second rail 200 together with the tray rail 400.

Furthermore, the engaging pieces 520 extend from the body 510 toward the second rail 200, and are located to be engaged with a pair of guide slots provided in the second rail 200 to be movable by the length of the guide slots, being configured for preventing the tray rail 400 from being separated from the center console 1 when the tray rail 400 is withdrawn due to sliding thereof.

Buffering members 530 formed of an elastic material may be mounted on the engaging pieces 520, and the buffering members 530 are configured to absorb impact caused by a collision when the engaging pieces 520 are engaged with the front or rear portions of the guide slots.

Consequently, the buffering members 530 may absorb impact when the tray 2 is abruptly withdrawn from the center console 1 or pushed into the center console 1, and may thus prevent damage to the tray 2.

The first rail 100 may have wheel members 110 configured to support rail members 210 extending downwards from the second rail 200 and rotated by movement of the rail members 210 to guide sliding of the second rail 200, as shown in FIG. 3.

The wheel members 110 are provided in a pair to support each of both sides of the rail members 210 to guide sliding of the rail members 210, and are rotatably mounted in mounting holes H formed in the first rail 100, as shown in FIG. 10.

Here, as shown in FIG. 11, the mounting holes H may be provided in plural so that distances between the mounting holes H in respective pairs are different, and the wheel members 110 may be mounted in a selected pair of the mounting holes H so that the mounted position of the wheel members 110 is varied.

When the wheel members 110 are mounted in a pair of the mounting holes H including the longest distance therebetween, the overlap amount of the rail members 210 is relatively reduced, and thus, the operating force of the second rail 200 becomes light.

On the other hand, when the wheel members 110 are mounted in a pair of the mounting holes H including the shortest distance therebetween, the overlap amount of the rail members 210 is relatively increased, and thus, the operating force of the second rail 200 becomes heavy.

Accordingly, when the distance between the mounting holes H facing each other and provided in a pair is selected to set the operating force of the second rail 200 and the wheel members 110 are mounted in the selected mounting holes H, the operating force of the second rail 200 may be varied, and thereby, the operating force of the second rail 200 depending on sliding of the center console 1 may be set at a user's request.

In the same manner, the above-described wheel members 110 may be also mounted on the second rail 200, and therefore, when the wheel members 110 are mounted in a selected pair of mounting holes H among a plurality of mounting holes H formed in the second rail 200 so that distances between the mounting holes H provided in respective pairs are different, the operating force of the tray rail 400 depending on sliding of the tray 2 may also be set.

The present disclosure provides a center console device for vehicles which employs a three-stage rail structure having rails slidably combined with each other to facilitate not only sliding of a center console but also sliding of a tray received in the center console and thus to achieve structural simplification for sliding and to improve convenience of use.

Furthermore, the present disclosure provides not only sliding structures of the center console and the tray but also locking structures of the center console and the tray, being configured for adjusting the sliding positions of the center console and the tray.

Furthermore, the present disclosure applies guide wheel structures including an adjustable distance therebetween, and may thus selectively adjust the sliding speeds of the center console and the tray when the center console and the tray are slid, being configured for controlling the operating forces of the center console and the tray.

As is apparent from the above description, the present disclosure provides a center console device for vehicles which employs a three-stage rail structure including rails slidably combined with each other to facilitate not only sliding of a center console but also sliding of a tray received in the center console and thus to achieve structural simplification for sliding and to improve convenience of use.

Furthermore, the present disclosure provides not only sliding structures of the center console and the tray but also locking structures of the center console and the tray, being configured for adjusting the sliding positions of the center console and the tray.

Furthermore, the present disclosure applies guide wheel structures including an adjustable distance therebetween, and may thus selectively adjust the sliding speeds of the center console and the tray when the center console and the tray are slid, being configured for controlling the operating forces of the center console and the tray.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A console apparatus for vehicles, the apparatus comprising:
   a first rail fixed to a vehicle body:
   a second rail combined with the first rail to be selectively slid in forward and rearward directions, and combined with a center console;
   a first stopper mounted on the second rail to be slid together with the second rail, and engaged with the first rail to selectively fix a sliding position of the second rail;
   a tray rail combined with the second rail to be slid in the forward and rearward directions, and combined with a tray provided in the center console; and
   a second stopper mounted on the tray rail to be slid together with the tray rail, and engaged with the second rail to selectively fix a sliding position of the tray rail.

2. The console apparatus of claim 1, wherein the first stopper includes:
   a main body fixedly mounted on the second rail;
   a rail rod combined with an inside of a guide area provided in the main body, and provided to be movable within the guide area; and
   a pair of rack members provided to include a shape corresponding to a shape of a front portion of the rail rod, and configured to be selectively moved in directions facing each other due to elasticity, as the rail rod is moved.

3. The console apparatus of claim 2, wherein the first stopper further includes:
   at least one first elastic member mounted in the main body, connected to the front portion of the rail rod, and configured to provide elastic restoring force to return the rail rod to an initial position of the rail rod.

4. The console apparatus of claim 3, wherein the initial position is a position configured so that the pair of rack members is spaced from each other by the rail rod.

5. The console apparatus of claim 2, wherein the rack members are formed so that one side of each of the rack members configured to come in contact with the front portion of the rail rod is inclined in a direction corresponding to a remaining one of the rack members.

6. The console apparatus of claim 5,
   wherein the rail rod includes a protrusion, and
   wherein in response that the rail rod is returned to the initial position, the protrusion of the rail rod pushes the rack members and thus the rack members are located to be spaced apart from each other.

7. The console apparatus of claim 2, wherein the rack members include coupling protrusions configured to extend downwards in a direction toward the first rail, and formed in a serrated shape.

8. The console apparatus of claim 7, wherein the first rail includes coupling guides formed in a serrated shape corresponding to the coupling protrusions, and configured to guide the second rail to fix the sliding position of the second rail, as the coupling protrusions are selectively engaged with the coupling guides.

9. The console apparatus of claim 1, wherein the second stopper includes:

a body combined with the tray rail; and engaging pieces configured to extend from the body toward the second rail, and located to be engaged with a pair of guide slots provided in the second rail to fix the sliding position of the tray rail.

10. The console apparatus of claim 9, wherein the second stopper further includes:

buffering members configured to absorb impact in response that the engaging pieces are engaged with first and second end portions of the guide slots.

11. The console apparatus of claim 10, wherein the buffering members are formed of an elastic material.

12. The console apparatus of claim 1, wherein the first rail includes wheel members configured to support rail members configured to extend downwards from the second rail, and rotated by movement of the rail members to guide sliding of the second rail.

13. The console apparatus of claim 12, wherein the wheel members are provided in a pair to support each of first and second sides of the rail members, and are rotatably mounted in mounting holes formed in the first rail.

14. The console apparatus of claim 13, wherein the mounting holes are provided in plural so that distances between the mounting holes provided in respective pairs are different, and the wheel members are mounted in a selected pair of the mounting holes so that a mounted position of the wheel members is varied.

15. The console apparatus of claim 1, wherein the tray rail includes rail covers provided to shield first and second sides of the tray rail exposed due to withdrawal of the tray rail together with the tray to an outside of the center console.

* * * * *